United States Patent [19]

Kölln et al.

[11] Patent Number: 4,884,969

[45] Date of Patent: Dec. 5, 1989

[54] TUNNEL KILN

[75] Inventors: Bernd Kölln, Ammerndorf; Rüdiger Grün, Lauf, both of Fed. Rep. of Germany

[73] Assignee: Ludwig Riedhammer Gmbh, Fed. Rep. of Germany

[21] Appl. No.: 86,690

[22] PCT Filed: Nov. 13, 1986

[86] PCT No.: PCT/DE86/00465

§ 371 Date: Jul. 6, 1987

§ 102(e) Date: Jul. 6, 1987

[87] PCT Pub. No.: WO87/03078

PCT Pub. Date: May 21, 1987

[30] Foreign Application Priority Data

Nov. 16, 1985 [DE] Fed. Rep. of Germany ....... 3540764

[51] Int. Cl.$^4$ .............................................. F27B 9/02
[52] U.S. Cl. ..................................... 432/133; 432/137; 432/145; 432/72
[58] Field of Search ........ 432/128, 133, 136, 143–146, 432/149, 150, 72

[56] References Cited

U.S. PATENT DOCUMENTS

| 3,172,647 | 3/1965 | Remmey | 432/133 |
| 3,416,778 | 12/1968 | Chabaglian | 432/133 |
| 3,869,249 | 3/1975 | Frische | 432/133 |
| 4,217,091 | 8/1980 | Whike et al. | 432/72 |
| 4,249,895 | 2/1981 | Mantegani | 432/133 |
| 4,674,975 | 6/1987 | Corato et al. | 432/145 |
| 4,715,810 | 12/1987 | Ramsey et al. | 432/72 |

FOREIGN PATENT DOCUMENTS

2405448 4/1979 France .

Primary Examiner—Henry C. Yuen
Attorney, Agent, or Firm—John F. A. Earley; John F. A. Earley, III; P. Michael Walker

[57] ABSTRACT

The invention relates to a tunnel kiln for fine ceramic products comprizing a heating section, a firing section, and a cooling section, where by means of gas conveying means (10) gases are taken in from the region of said cooling section (140, 176, 182) and are conveyed to said firing section (41, 78, 80, 126, 128), whereby at least one additional burner (132) is arranged in a transition region (130) between said firing section (128) and said cooling section (140).

6 Claims, 8 Drawing Sheets

TUNNEL KILN

The invention relates to continuously operating furnaces (tunnel kilns) for fine ceramic products. In connection with the present invention, the term "tunnel kiln" includes all types of kilns where the products are continuously fired. This includes, for example, roller-hearth kilns, but also sled-type kilns and the like.

Such a tunnel kiln has, from the kiln entrance to the kiln exit, a preheating section, a firing section equipped with burners, and a cooling section subsequent thereto.

The invention relates to such tunnel kiln having gas conveying means at the products entrance, the gas conveying means suctioning, in opposite direction to the conveying direction of the products (from the preheating to the cooling section), gas from at least the firing section to the products entrance, and having at least one air transport means for feeding air to the cooling section. In addition, the invention relates to a method for operating such tunnel kiln.

As shown in DE-C 30 17 434, during firing of earthenware like bricks or roof tiles in tunnel kilns with firing periods of approximately 50 to 60 hours air might be sucked in reversed flow from the cooling to the preheating section in order to save energy. For fine ceramics, for example floor or wall tiles, this is not feasible because of the delicacy of the products, where a certain temperature profile over the length of the kiln has to be exactly maintained. A high throughput and a certain saving of energy may be achieved with fine ceramics by using rapid-firing kilns, for example roller-hearth kilns, because the rollers are maintained at a constant temperature and it is not required to heat up the rollers at each new firing circle.

For adjusting and maintaining the temperature profiles, however, numerous separate means for transporting air and waste gases are required. The counterflow draft must on no account extend over the firing section into the cooling section, because otherwise the firing process is severly disturbed and the rate of rejections increases dramatically.

It is an object of the present invention to provide a continuously operating kiln and a method for operating such a kiln, which make energy savings feasible and reduce the expense for apparatus.

In connection with the kiln the object is achieved by the gas conveying means taking in gases also from the region of the cooling section and conveying them into the firing section, and by arranging, in a transition region between firing section and cooling section, at least one additional burner. In doing so the gases conveyed from the cooling section are heated up to firing temperature.

In a surprising departure from the prior art it is possible, by means of the present invention, to suck (colder) air from the cooling section into the firing section. As the cooling air heated by the ceramic products already has a temperature of approximately 800° to 900° C. at the entrance of the cooling section, the additional burner only has to provide the energy required for heating up to the firing temperature, that is for tiles approximately in the range of 1200° C. Attempts in the past to introduce the hot air of approximately 800° C. which had been sucked from the cooling section to the burners in the firing section have failed, because the pipes with valves, measurement apparatus, and fans arranged therein would withstand this high temperature only for a short time, if at all, thus leading to high costs for repair.

These problems are not present with the solution according to the invention where gases are taken in within the kiln. A disturbance of the temperature profile in the firing section is positively avoided by heating up with additional burners which only have to compensate a considerable smaller temperature difference. The achievable energy savings are considerable and are of the order of 40 to 50%. To begin with, this concerns only the energy consumption of the burners.

As suggested in DE-A 29 47 787 additional burners are provided in the cooling section of a kiln. These burners distributed over the cooling section serve another purpose, however, that is to provide a heat equalisation in the case of failures of the kiln operation.

A further reduction of the energy required for operating the kiln is provided, according to the present invention, by consuming less electrical energy, because now only one fan at the kiln entrance, for taking in the gases in counterflow direction to the conveying direction of the products, and another fan for transporting fresh air are required. All additional fans which had previously been necessary may be discarded. This also increases security from malfunctions of a tunnel kiln according to the present invention.

According to a preferred embodiment of the invention the additional burner takes in its combustion air from the inside of the tunnel kiln only. By this the burner may have a particularly simple construction.

It is particularly advantageous if several additional burners are provided, preferredly arranged in mutually opposite relationship in the side walls of the kiln.

According to a still further preferred embodiment of the invention the cooling section is divided into a rapid-cooling section and at least one, preferably several cooling subsections. After the so called rapid-cooling there are, therefore, several cooling sections in which a decrease in temperature from approximately 650° C. to 200° C. is performed, and finally another rapid-cooling, for example to room temperature. Thus the slower cooling required in the range of the quartz step (approximately 575° C.) may be provided. Surprisingly, the suction of the fan arranged at the kiln entrance has no adverse effect.

Still further energy savings may be achieved if the suction of the fan arranged at the kiln entrance extends up to that position in the cooling section where an air temperature of approximately 300° C. prevails. On account of the counterflow in the cooling section cooler air is guided to regions where the ceramic products have a higher temperature, thus adding to the cooling action. Therefore, less "cold" air has to be introduced. According to the prior art also the heated air had to be separately led off from the respective subsections, without being available for the cooling; the electrical energy required for this purpose can be saved, too, according to the invention.

Preferredly, the burners are arranged in the firing section in irregular distances from each other. It has been found that the required temperature profile may be maintained even if some burners are omitted. This leads to further energy savings and reduces the production costs.

According to still another preferred embodiment of the invention even in the firing section a large region is provided which is not equipped with burners, and is annexed, in the front and back with respect to the conveying direction of the products, by firing sections equipped with burners. It has been found that not only the above-mentioned savings may be achieved, but that another advantage is added: on account of the oxygen-rich air coming from the cooling section and being introduced into the sectio not equipped with burners, the characteristics of the products with respect to outgassing of organic components are improved, too. Therefore, the feedthrough rate of products through the kiln may be enlarged without a loss in quality.

In principle, the additional burner may be constructed like the other conventional burners in the firing section. According to a particular simple and cost-effective embodiment of the invention the additional burner comprizes a burner tube, the one end section of which is equipped with means for connecting a fuel line, and the other end section of which has at least one recess for taking in combustion air. The burner tube should have means for guiding the fuel at the inside, this means changing into a nozzle which terminates before the recess. Thus, the burner needs only one fuel connection and takes in its combustion air via the recess in the end section protruding into the inside of the kiln. The burner flame develops at the nozzle orifice.

Preferredly, the burner tube is made of ceramics. In this case the burner tube may be easily and cost-effectively produced and has a relatively high durability.

A particular advantageous flame shape and thus a constant operation of the burner is achieved, if two oval-shaped recesses are arranged at the side, in the region of the flame exit orifice, where the longer axis of the respective oval runs parallel to the longitudinal axis of the burner.

Furthermore, the invention suggests a method for operating the above-mentioned tunnel kiln with the following steps:

At first, gases are taken in by means of the gas conveying means from the cooling section, in counterflow to the conveying direction of the products, into the firing section. Before introducing the gases which have been taken in the gases are heated up to firing temperature.

The advantages as described above are valid for the method according to the present invention, too. Accounting to the relatively oxygen-rich air which is taken in from the cooling section of the kiln, the firing conditions in the firing section are also improved. Therefore, with the method according to the present invention the burners may be operated with stoichiometric or even less than stoichiometric combustion which further reduces energy consumption.

Furthermore, the invention suggests to use at least one burner for heating up the conveyed gases which is only supplied with fuel and takes its combustion air from the air which is sucked into the firing section. Preferredly, the burner is operated on gas. For the means according to the present invention as well as the method the use of, for example, fuel oil or gas as a fuel is possible as well.

According to an advantageous embodiment of the invention the cooling air in the rapid-cooling section should heat up to approximately 800° to 900° C. A further cooling section annexed thereto serves to achieve a slower cooling in the conveying direction of the products to approximately 200° C. (air temperature). The suction of the gas conveying means extends approximately as far as the region of the cooling section, where a temperature of approximately 300° C. prevails. Thus, an excellent firing result is achieved with maximal energy savings.

Finally, the invention suggests taking in fresh air by means of a single air transport means, that is in the region of the last cooling section with respect to the conveying direction of the products, where fresh air is supplied to this cooling section from the exit orifice of the tunnel kiln. Thus the temperature profile may be optimally adjusted and particularly little energy is consumed.

The invention is subsequently explained in more detail in connection with a preferred embodiment. This shows further advantages and features of the invention.

In a schematic representation it is shown in.

of a tunnel kiln according to the invention.

In general it is to be noted that parts shown in several figures are frequently designated with reference numbers only once, in order to achieve a better clearness and a limitation to essential details.

Figure 1:
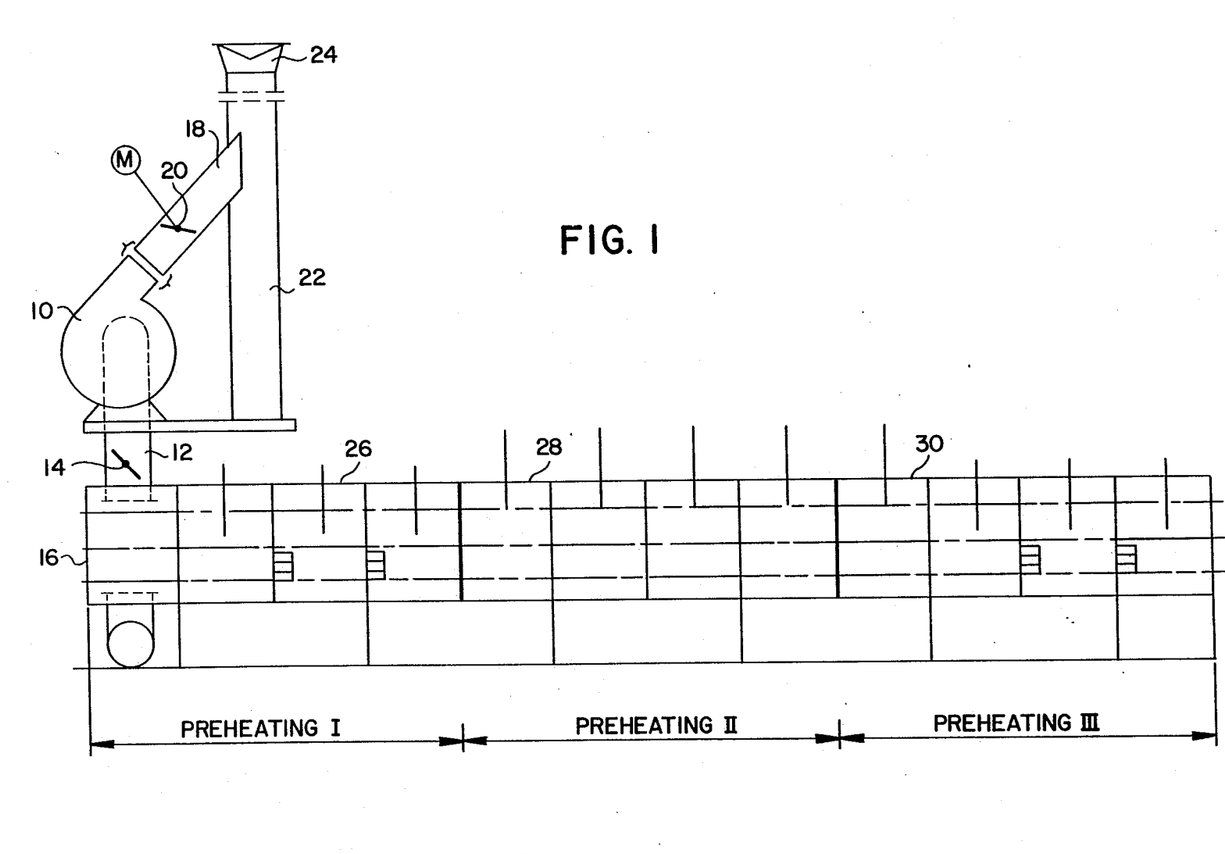
FIG. 1 a side view of the entrance section with suction fan and three pre-dryers.

FIG. 1 shows the entrance section, with respect to the firing products, of a roller-hearth kiln comprising three pre-dryers 26, 28, 30 in the preheating section. The products are lead to a charging door 16. A conduit channel 12 having a flap 14 for adjusting the feed-through of gas runs into this region and leads to a suction fan 10. Gas is drawn in from the roller-hearth kiln by fan 10, thus producing a partial vacuum in the preponderant part of the kiln. The drawn-off gas is introduced by fan 10 via a pipe 18 having a further, motor-driven control flap 20 to an exhaust shaft 22 which is blanked off to the top by a chimney flap 24. Channel 12 is connected to the upper and lower sides of the roller-hearth furnace having a rectangular cross section, on order to guarantee a constant draft.

Figure 2:
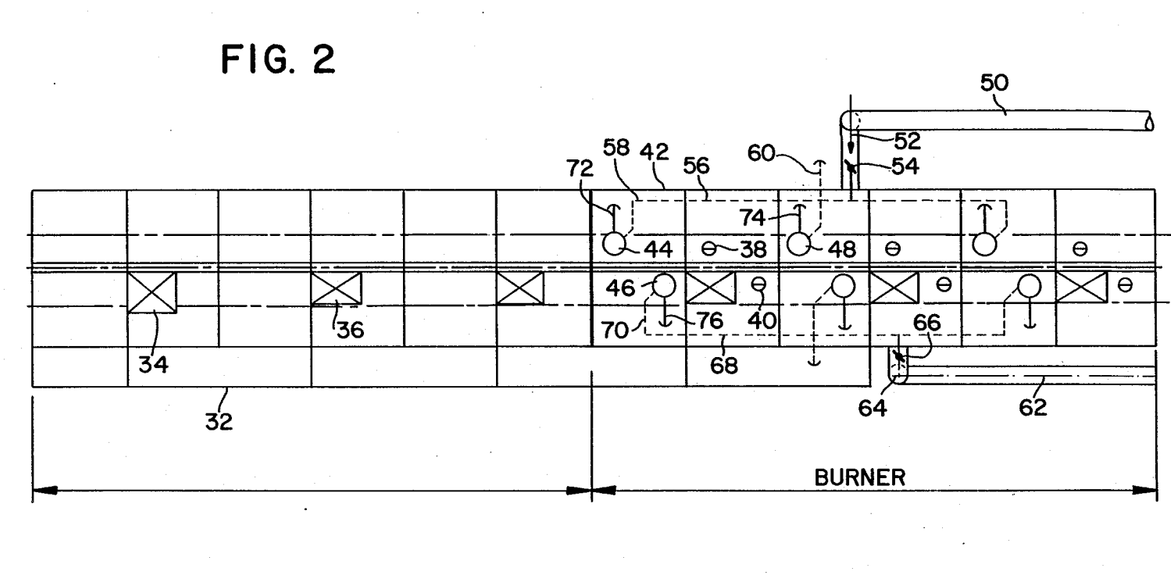
FIG. 2 a side view of an intermediate section and of the first region of the firing section.

As shown in FIG. 2, the products to be fired reach a transition region 32 behind the pre-dryer 30. This region, as is the case with the following sections of the tunnel kiln, is equipped with inspection flaps, for example 34, 36, which may be opened in cases of operation malfunctions or for maintenance and which make access to the respective section possible.

The transition region 32 is followed by the firing section, that is at first a firing section portion 42. In this portion twelve burners are provided, of which the six burners arranged at one of the two side walls of the kiln are discernible in FIG. 2, three of which are designated by reference numbers 44, 46, and 48. Fresh air is supplied to a pipe 56 via an upper fresh air duct 50 and a pipe section 52, controlled by a flap 54, and pipe 56 is arranged in the kiln side wall in order to heat up the fresh air. The heated-up air is supplied to burners 44 and 48, respectively, by pipes 58 and 60. Pipes 72 and 74, respectively, supply fuel (gas, in the present embodiment) to burners 44, 48. A similar burner arrangement is disposed, displaced with respect to the conveying direction of the products, in the opposite side wall which is not shown, for example there, where the inspection flaps 38, 40 are shown.

In the side wall of the kiln inspection flaps, for example 38 and 40, are provided as well as maintenance flaps which are not designated any further.

In symmetrical arrangement to burners 44, 48 disposed in the upper region of the firing section, but displaced by a certain amount with respect to the conveying direction of the products, lower burners are arranged, the first of which is designated by 46. Burner 46 receives fresh air by a pipe 70, a pipe section 68 arranged in the side wall of the kiln for heating up, and by a pipe 64, which leads down and has a control flap 66. As a central supply pipe for the lower region, similar to pipe 50 in the upper region, a pipe 62 is provided. Gas supply for lower burner 46 and the other two lower burners is via gas supply pipes, for example 76 to burner 46.

Figure 3:
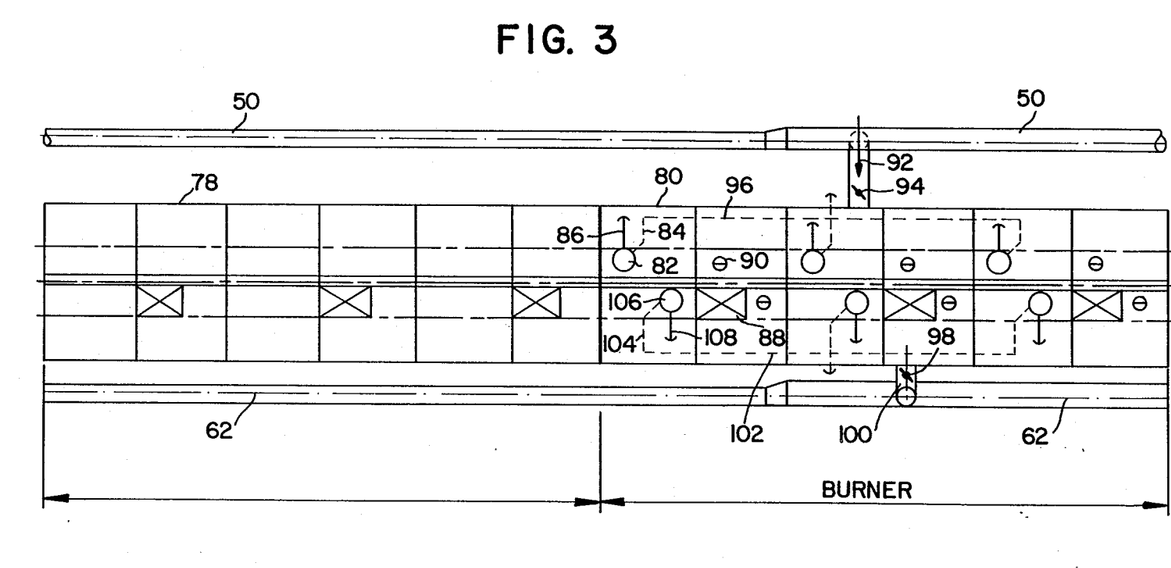
FIG. 3 a side view of another part of the firing section where burners are arranged in irregular distances.

FIG. 3 shows the region adjacent to firing section portion 42, at first a firing section portion 78 which is not equipped with burners, and a portion 80 adjacent thereto. In firing section portion 80 three burners, for example 82, are disposed in the upper part of the side wall shown in the figure, and in the lower region also three burners, for example 106, are disposed, such that this portion of the firing section has, in total, twelve burners in the two side walls. In a similar way as already described, on top fresh air is supplied to a pipe 96 in the side wall of the kiln from pipe 50 via pipe 92 equipped with a control flap 94, and the fresh air arrives via pipe 84 at burner 82 which is supplied with gas by a connection pipe 86.

In the lower region fresh air supply from pipe 62 is via pipe 100 equipped with a control flap 98 leading via pipe 102, 104 to lower burner 106. Burner 106 is supplied with gas by a gas pipe 108.

Figure 4:
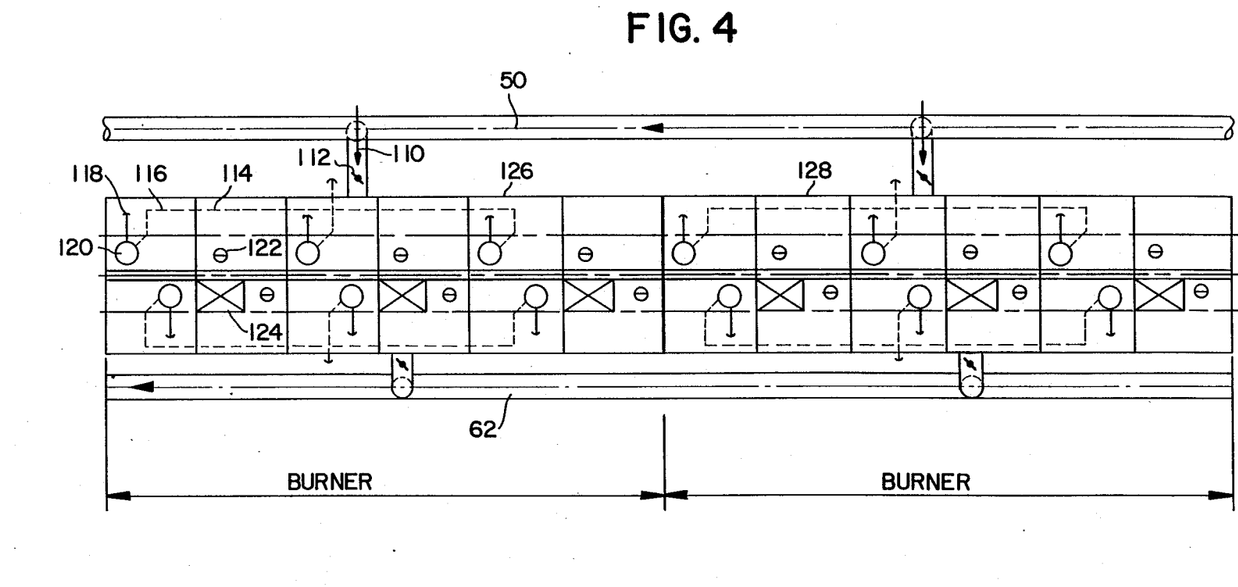
FIG. 4 a side view of another part of the firing section with regularly arranged burners.

The firing section portion 80 is followed, as shown in FIG. 4, by a firing section portion 126 and then another firing section portion 128. Both are equipped, like portion 80, with twelve burners each, of which only an upper burner 120 is designated by a reference number as an example.

Burner 120 is supplied by pipe 118 with gas and by pipes 116, 114, and 110, which eventually lead to pipe 50, with fresh air. For control purposes as already described a control flap 112 is arranged in pipe section 110. A corresponding arrangement is provided for the lower burners which receive fresh air from pipe 62.

Inspection (122) and maintenance flaps 124 are provided in the side walls of firing section portions 126, 128, too.

According to the prior art the suction of a fan arranged at the kiln entrance might only extend as far as firing section portion 128, but not further.

Figure 5:
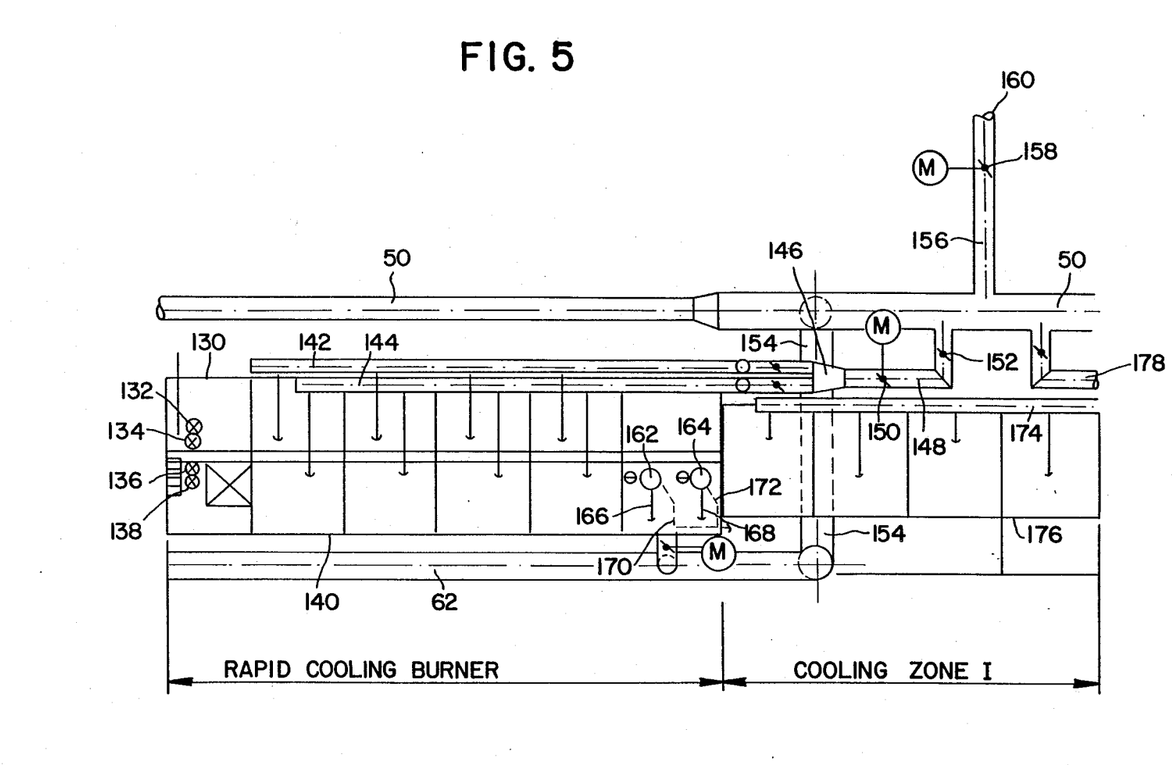
FIG. 5 a side view of a rapid-cooling section and a first cooling section.

FIG. 5 shows a first portion of the cooling section. In a transition region additional burners are provided for heating up the gases which are taken in from the cooling section into the firing section, according to the invention.

In each side wall of transition region 130 four additional burners 132, 134, 136, and 138 are arranged and will be subsequently explained in more detail in connection with FIG. 8. Thus, region 130 is equipped with eight burners in total.

From transition region 130 the products reach a rapid-cooling section 140 where air leaving the pipes 142, 144 arranged on top of the kiln is admitted to the products. As the suction of the fan 10 at the kiln entrance (FIG. 1) extends further than rapid-cooling section 140 additional cooling is provided by gases supplied from the next cooling section.

Pipes 142, 144 come to a branching 146 from which a pipe 148 having control flaps 150 (motor-driven) and 152 leads to upper central pipe 50. This is provided with a blow-off pipe 156 having a blow-off orifice 160, and the amount to be blown off can be controlled by a motor-driven flap 158.

In the back region of rapid-cooling section 140, in each side wall, burners 162, 164 are disposed which are supplied with fresh air by pipes 170 and 172, respectively, and with gas by pipes 166 and 168, respectively. These burners are provided for adjusting the cooling-down profile when the charge is irregular or, when starting the kiln, no products have yet arrived in the cooling section.

Rapid-cooling section 140 is annexed by a cooling section 176. To this section cooling air is supplied by an upper pipe 174 and a subsequent second cooling section 182 (FIG. 6), the latter because of the suction of fan 10.

Figure 6:
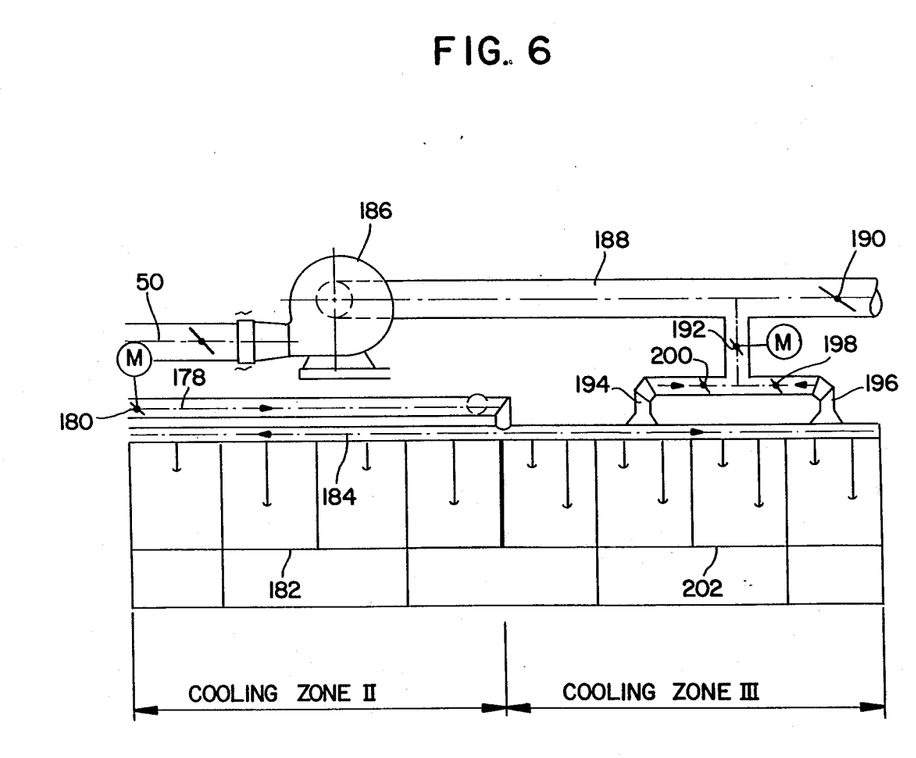
FIG. 6 a side view of a second and a third cooling section.

Fresh air fan 186 is shown in FIG. 6 and supplies pipe 50 and thus (FIG. 5) lower pipe 62 with air. Air is supplied to a cooling pipe 184 on cooling section 182 via pipe 178, controlled by a motor driven control flap 180. A further cooling section 202 is annexed to cooling section 182. Intake pipe 188 of fan 186 leads, via a motor driven control flap 192, to pipes 194, 196 on cooling section 202 which are likewise equipped with control flaps 200 and 198, respectively.

Figure 7:
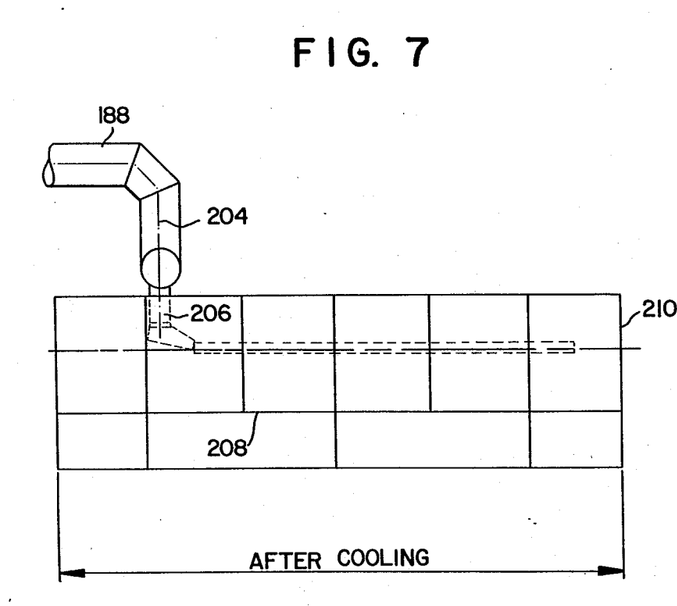
FIG. 7 a side view of an aftercooling section.

FIG. 7 shows the last (aftercooler-) section 208 of the tunnel kiln. Suction pipe 188 of fan 186 is connected via pipe section 204 and a channel 206 to aftercooler section 208, such that air is taken in via the exit port 210, arranged at the end of section 208, for the products.

Operating temperatures are approximately 1200° C. in the region of firing section 128, 800° to 900° C. in the region of rapid-cooling section 140, linearly decreasing 650° C. at the beginning of the first cooling section 176 and 200° C. an the end of third cooling section 202. The suction of fan 10 extends approximately up to the region of second cooling section 182 where a temperature of approximately 300° C. prevails. In the aftercooler section 208 a temperature of approximately 60° to 80° C. is reached. All above-mentioned temperatures are air temperatures.

Figure 8:
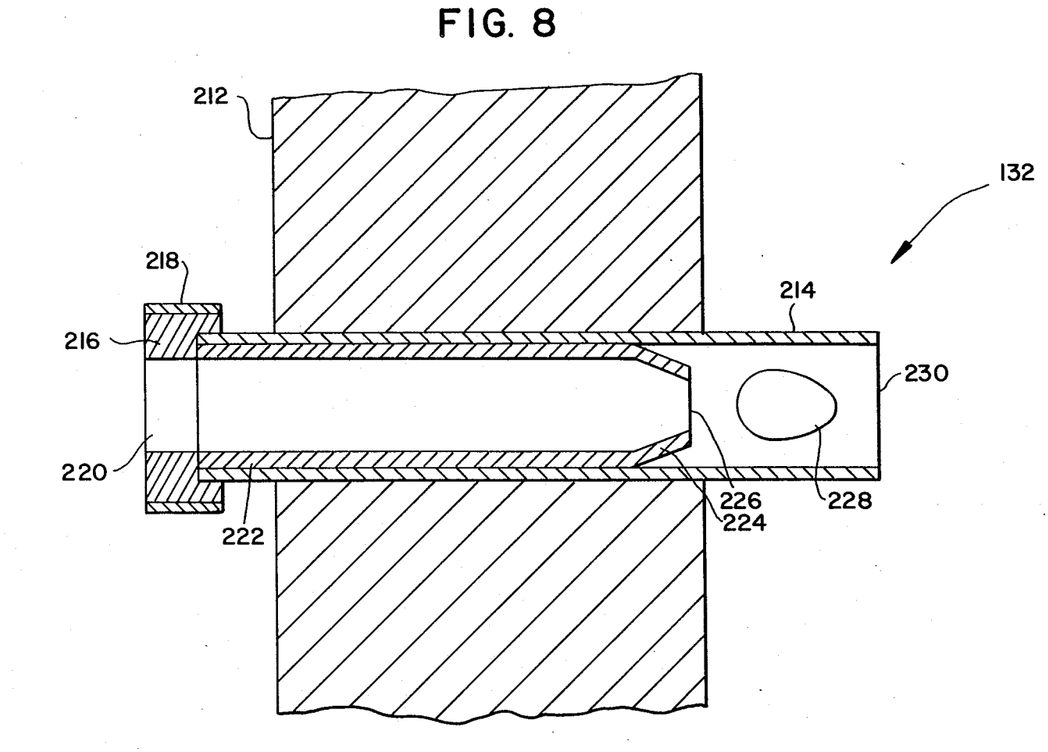
FIG. 8 a sectional view of an additional burner according to the invention.

FIG. 8 shows a preferred embodiment of a burner 132. In a recess in a side wall 212 of the tunnel kiln a ceramic pipe 214 is received which protrudes at both ends. On one end, the ceramic pipe has a connecting means 216 for a gas pipe which may be secured with an outer thread 218.

Gas flows from an entrance orifice 220 via a nozzle insert 222 which may be made of temperature-resistant steel, via a tapered nozzle 224 to nozzle orifice 226. At the end of ceramic pipe 214 protruding into the inside of the kiln two recesses 228 are arranged through which combustion air from the inside of the kiln is taken in. After ignition of the burner a flame builds up between nozzle orifice 226 and the recess 228, and the flame may extend over the exit orifice of ceramic pipe 214 depending on the fuel pressure.

Finally, it is to be noted that on the opposed side wall (not shown) of the kiln also burners (not shown) may be arranged, preferably as many as in the wall shown in the figure.

The term "fine ceramic products" is meant to include special ceramic products like, for example, filters made of foamed aluminum oxide and the like.

We claim:

1. A burner for a tunnel kiln, in particular a tunnel kiln for fine ceramic products comprising a preheating section, a firing section equipped with burners and a cooling section adjacent thereto, with a gas conveying means arranged at the products entrance which takes in gas from at least said firing section to said products entrance in the opposite direction with respect to the conveying direction of said products, and with at least one air transport means for transporting air to said cooling section, characterized in that said gas conveying means (10) takes in gases also from the region of said cooling section (140, 176, 182) and conveys them into said firing section (42, 78, 80, 126, 128), and that at least one additional burner (132) is arranged in a transition region between said firing section (128) and said cooling section (140),
   that a burner tube (214) is provided, one end section of which has means (216) for connecting a fuel line, and the other end section of which has at least one recess (228) for taking in combustion air, said tube having at its inside fuel guiding means (222) tapering off into a fuel nozzle (224) which ends before said recess (228), and
   that two oval-shaped recesses (228) arranged in symmetric fashion in the wall of said burner tube (214) are provided, where the longer axis of said oval extends in parallel relationship to the longitudinal axis of said burner tube (214).

2. A tunnel kiln for firing fine ceramic products comprising, arranged in succession a preheating section, a firing section equipped with burners and a cooling section with gas conveying means arranged at the entrance of the preheating section, the gas conveying means sucking gas from at least said firing section to said entrance of the preheating section in opposite direction with respect to the conveying direction of said products, and with at least one air transport means for transporting air to said cooling section, said gas conveying means (10) including means for sucking gases also from the region of said cooling section (140,176,182) and for conveying those gases directly through said cooling section into said firing section (42, 78, 80, 126, 128), and at least one additional burner (132) being arranged in a transition region between said firing section (128) and said cooling section (140),
   said burner (132) taking its combustion air only from the inside of said kiln,
   said cooling section being subdivided into a rapid-cooling section (140) and several cooling-subsections (176, 182, 202, 208) adjacent thereto,
   the suction of said gas conveying means (10) extending into that region of said cooling-subsection (182) when an air temperature of approximately 300° C. prevails,
   burners (44, 46, 48, 82, 106, 120) being arranged in the firing chamber (42, 78, 80, 126, 128) in irregular distances to each other with respect to the conveying direction of the products,
   in the conveying direction of the products, a firing section portion (42) equipped with burners (44, 46, 48) arranged in regular distances being annexed by a firing section portion (78) not equipped with burners which is annexed by a firing section portion (80, 126, 128) equipped with burners (82, 106, 120) arranged in regular distances.

3. A burner for a tunnel kiln, in particular a tunnel kiln for fine ceramic products comprising a preheating section, a firing section equipped with burners and a cooling section adjacent thereto, with a gas conveying means arranged at the products entrance which takes in gas from at least said firing section to said products entrance in the opposite direction with respect to conveying direction of said products, and with at least one air transport means for transporting air to said cooling section, characterized in that said gas conveying means (10) takes in gases also from the region of said cooling section (140, 176, 182) and conveys them into said firing section (42, 78, 80, 126, 128), and that at least one additional burner (132) is arranged in a transition region between said firing section (128) and said cooling section (140),
   characterized in
   that a burner tube (214) is provided, one end section of which has means (216) for connecting a fuel line, and the other end section of which has at least one recess (288) for taking in combustion air, said tube having at its inside fuel guiding means (222) tapering off into a fuel nozzle (224) which ends before said recess (288),
   said burner tube (214) is made of ceramics,
   two oval-shaped recesses (228) arranged in symmetric fashion in the wall of said burner tube (214) are provided, where the longer axis of said oval extends in parallel relationship to the longitudinal axis of said burner tube (214).

4. A tunnel kiln for firing fine ceramic products comprising
   a tunnel chamber through which the ceramic product is moved, and
   a burner mounted in the tunnel chamber,
   the burner having a burner tube, one end section of which has means for connecting to a fuel line, and the other end section of which has two recesses for taking in combustion air, said tube having an inner portion having fuel guiding means tapering off into a fuel nozzle which ends before the recesses,
   the two recesses being oval-shaped and arranged in symmetric fashion in the burner tube, the longer axis of said oval extending in parallel relationship to the longitudinal axis of the burner tube.

5. A tunnel kiln for firing fine ceramic products comprising, arranged in succession, a preheating section, a firing section equipped with burners and a cooling section, with gas conveying means arranged at the entrance of the preheating section, the gas conveying means sucking gas from at least said firing section to said entrance of the preheating section in opposite direction with respect to the conveying direction of said products, and with at least one air transport means for transporting air to said cooling section, said gas conveying means (10) including means for sucking gases also from the region of said cooling section (140, 176, 182) and for conveying those gases directly through said cooling section into said firing section (42, 78, 80, 126, 128), and at least one additional burner (132) being arranged in a transition region between said firing section (128) and said cooling section (140),
   characterized in that the burner is provided with a burner tube (214), one end section of which has means (216) for connecting a fuel line, and the other end section of which has at least one recess (228) for taking in combustion air, said tube having at least its inside fuel guiding means (222) tapering off into a fuel nozzle (224) which ends before said recess (228), further characterized in that two oval-shaped recesses (228) arranged in symmetric fashion in the wall of said burner tube (214) are provided, where the longer axis of said oval extends in parallel relationship to the longitudinal axis of said burner tube (214).

6. A tunnel kiln for firing fine ceramic products comprising, arranged in succession, a preheating section, a firing section equipped with burners and a cooling section, with gas conveying means arranged at the entrance of the preheating section, the gas conveying means sucking gas from at least said firing section to said entrance of the preheating section in opposite direction with respect to the conveying direction of said products, and with at least one air transport means for transporting air to said cooling section, said gas conveying means (10) including means for sucking gases also from the region of said cooling section (140, 176, 182) and for conveying those gases directly through said cooling section to said firing section (42, 78, 80, 126, 128), and at least one additional burner (132) being arranged in a transition region between said firing section (128) and said cooling section (140), characterized in that the burner is provided with a burner tube (214), one end section of which has means (216) for connecting a fuel line, and the other end section of which has at least one recess (288) for taking in combustion air, said tube having at its inside fuel guiding means (222) tapering off into a fuel nozzle (224) which ends before said recess (288), said burner tube (214) is made of ceramics, two oval-shaped recesses (228) arranged in symmetric fashion in the wall of said burner tube (214) are provided, where the longer axis of said oval extends in parallel relationship to the longitudinal axis of said burner tube (214).

* * * * *